United States Patent [19]

Preik

[11] Patent Number: 5,150,497
[45] Date of Patent: Sep. 29, 1992

[54] TRUCK MIRROR WIPER

[76] Inventor: Marc R. Preik, 121 Boyette Dr., Lenoir, N.C. 28645

[21] Appl. No.: 802,050

[22] Filed: Dec. 3, 1991

[51] Int. Cl.⁵ .................. B60S 1/06; B60S 1/14; B60S 1/44

[52] U.S. Cl. ............... 15/250.003; 15/250.1; 15/250.04; 15/250.3; 15/250.35

[58] Field of Search ........... 15/250 A, 250 B, 250 R, 15/250.1, 250.35, 250.32, 250.18, 250.31, 250.29, 250.01, 250.05, 250.11, 250.04; 296/96.15, 152

[56] References Cited

U.S. PATENT DOCUMENTS

| | | | |
|---|---|---|---|
| 2,563,252 | 8/1951 | Larsen | 15/250.1 |
| 2,636,775 | 4/1953 | Fineo | 296/152 |
| 2,666,941 | 1/1954 | Oishei | 15/250.1 |
| 2,697,632 | 12/1954 | Shapiro | 15/250.1 |
| 3,320,627 | 5/1967 | Engel | 15/250 B |
| 3,638,274 | 2/1972 | Farver | 15/250.1 |
| 3,866,258 | 2/1975 | DeGraw | 15/250.29 |
| 4,457,597 | 7/1984 | DeGideo | 350/582 |
| 4,527,301 | 7/1985 | Seitz | 15/250 B |
| 4,653,136 | 3/1987 | Denison | 15/250 B |
| 4,672,708 | 6/1987 | Williams | 15/250 B |
| 4,763,381 | 8/1988 | Williams | 15/250 B |
| 4,873,740 | 10/1989 | Vehrenwald | 15/250 B |

FOREIGN PATENT DOCUMENTS

| | | | |
|---|---|---|---|
| 2926118 | 11/1980 | Fed. Rep. of Germany | 15/250 B |
| 0155043 | 7/1986 | Japan | 15/250 B |
| 129157 | 12/1928 | Switzerland | 15/250.1 |

*Primary Examiner*—Harvey C. Hornsby
*Assistant Examiner*—Gary K. Graham
*Attorney, Agent, or Firm*—Rhodes, Coats & Bennett

[57] ABSTRACT

A truck mirror wiper for a truck having a side mirror to be wiped and a side window glass which may be raised and lowered and through which a driver looks to view the mirror. A clamp clamps the truck mirror wiper to the top of the window glass, and a bracket extends from the clamp to the proximity of the mirror. The bracket includes two lengths of rod, each having a threaded end, and a turnbuckle with two opposed threaded bores into which the two lengths of threaded rod may be screwed a desired distance to adjust the bracket length. A blade support has a pivotal connection to one of the rods, and a wiper blade affixed to the blade support is in contact with the mirror so that the azimuthal orientation of the blade may be matched to the azimuthal orientation of the mirror. When the driver lowers or raises the window glass, the wiper blade passes over the mirror to wipe it.

9 Claims, 1 Drawing Sheet

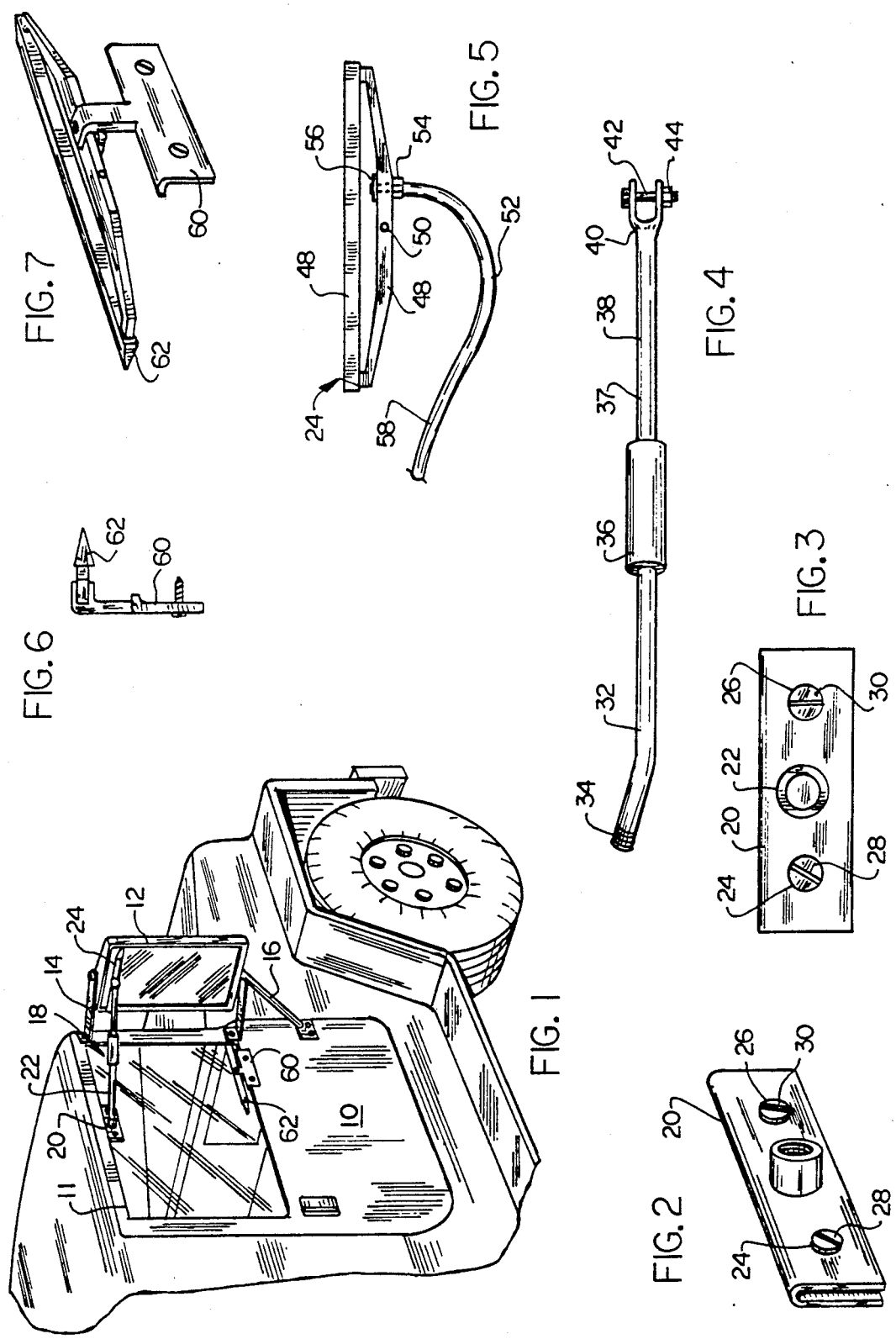

TRUCK MIRROR WIPER

BACKGROUND OF THE INVENTION

The present invention relates to improvements in wipers for the side mounted rearview mirrors of trucks.

Truck drivers rely on their side mounted rearview mirrors since most trucks have freight hauling portions which block the use of a rearview mirror mounted internally in the cab. Of course, it is very important that the driver get a good view of traffic behind him from his rearview mirror. However, being exposed to rain, snow, dew, dirt and road salt, the outside mirrors can become dirty and smeared, blocking the driver's view. Because the view through the outside mounted mirror is so critical to safe operation of the truck, the truck driver needs to keep the mirror clean.

Various efforts have been made in the past to provide wipers for the outside, side mounted rearview mirrors of trucks. For example, U.S. Pat. No. 3,866,258 to DeGraw and U.S. Pat. No. 4,527,301 to Seitz disclose wiper assemblies for side mounted rearview mirrors in which the wiper traverses the mirror as driven by a pneumatic cylinder. U.S. Pat. No. 4,653,136 to Denison and U.S. Pat. No. 4,873,740 to Vahrenwald et al. provide similar mirrors with the wiper being driven by an electric motor. U.S. Pat. No. 4,457,597 DeGideo discloses a wiper which is moved up and down by hand. U.S. Pat. No. 4,672,708 to H. Williams discloses a wiper which pivots under the hand operation of a bowden wire. He also discloses the possibility of actuating his bowden wire with a pneumatic drive. He also suggests the possibility of providing a washer fluid supply mechanism but does not give any details of such a mechanism. U.S. Pat. No. 4,763,381 to G. Williams discloses a rearview mirror wiper which also includes a washer and a liquid conduit from the washer liquid tank to a spray nozzle on the wiper. U.S. Pat. No. 3,320,627 to Engel discloses an automobile mirror wiper which is driven by a linkage to a conventional windshield wiper. The foregoing are just a few representative examples of efforts of others to deal with the problem of cleaning outside, side mounted mirrors, but generally they have the shortcoming of requiring the provision of a special mirror housing which includes a motive apparatus for the wiper to cause it to traverse the mirror. Thus, the apparatus of the prior patents is expensive, complicated and subject to failure.

Accordingly, there is a need in the art for a simple and inexpensive wiper for a side mirror which is easy to install and maintain.

SUMMARY OF THE INVENTION

The present invention fulfills this need in the art by providing a truck mirror wiper for a truck having a side mirror to be wiped and a side window glass which may be raised and lowered and through which a driver looks to view the mirror. The wiper includes a mount to mount the truck mirror wiper to the window glass, and a bracket extending from the mount to the proximity of the mirror when the mount is mounted on the window glass. A wiper blade affixed to the bracket is in contact with the mirror when the mount is mounted on the window glass, permitting driver to wipe the mirror by simply lowering or raising the window glass.

In a preferred embodiment the mount is in the form of a clamp to clamp the truck mirror wiper to the top of the window glass. In particular, the clamp may include a channel fitting over the top of the window glass and set screws passing through a portion of the channel to hold the channel in place on the top of the window glass.

Preferably, the bracket is of adjustable length, so that one size of wiper will fit many trucks. In one embodiment the bracket includes two lengths of rod, each having a threaded end, and a turnbuckle with two opposed threaded bores into which the two lengths of threaded rod may be screwed a desired distance to adjust the bracket length. The rods and turnbuckle together make up an arm of the bracket. Desirably, the bracket includes a blade support and a pivotal connection between the arm and the blade support, so that the azimuthal orientation of the blade may be matched to the azimuthal orientation of the mirror.

The truck mirror wiper may also include a conduit having two ends, one of which is adapted for operative connection to the truck windshield washer system and a mount for the other end on the bracket so that windshield washer fluid may be sprayed on the mirror by operation of the windshield washer system.

Another possible option is the addition of a side window wiper for wiping the side window glass simultaneously with the mirror wiping. This option may include a window wiper mount to mount the side window wiper to the mirror support on the truck and a window wiper bracket extending from the window wiper mount to the proximity of the lower portion of the window. A window wiper blade affixed to the window wiper bracket is thus in contact with the lower portion of the window when the window is raised. When the driver lowers or raises the window glass, the window glass passes the window wiper blade to wipe the window glass.

The invention also provides a method of wiping a side mirror of a truck having a side window glass which may be raised and lowered and through which a driver looks to view the mirror The method includes a preliminary step of affixing a truck mirror wiper including a wiper blade extending into contact with the side mirror to the top of the window glass, and the subsequent step of raising or lowering the window glass, thereby causing the wiper blade to pass over the mirror to wipe it. The raising or lowering step may include raising or lowering the window glass to the top or bottom of its range, respectively. Preferably, it includes both lowering and raising the window glass to cause the wiper blade to pass over the mirror twice.

The method may also include the preliminary step of affixing a window wiper to a mirror support including a window wiper blade extending into contact with the window glass, so that upon lowering or raising the window glass, the window glass passes the window wiper blade to wipe the window glass.

If the truck has a windshield washer system, the method may further include the preliminary step of affixing one end of a conduit to the windshield washer system and the other end of the conduit to the mirror wiper, and the subsequent step of operating the windshield washer system before or during the raising or lowering of the side window to spray windshield washer fluid on the mirror and wipe it.

The method and apparatus are particularly conveniently suited to trucks that have a power assisted side window, so the raising or lowering of the window may take place with the power assist, operated by the driver from controls convenient to him while driving. Of course, the invention may also be used on trucks that have a crank-operated side window.

BRIEF DESCRIPTION OF THE DRAWINGS

The invention will be better understood after a reading of the detailed description of the preferred embodiments and a study of the drawings in which:

FIG. 1 is a perspective view of a truck equipped with the apparatus of the invention;

FIG. 2 is a perspective view of a preferred embodiment of a clamp component of the present invention;

FIG. 3 is a side view of a preferred embodiment of a clamp component of the present invention;

FIG. 4 is a side view of a preferred embodiment of an arm of the bracket component of the present invention;

FIG. 5 is a plan view of a preferred embodiment of a blade and blade support component of the present invention, with attached washer hose;

FIG. 6 is a side view of a window wiper according to an embodiment of the invention; and FIG. 7 is a perspective view of the window wiper of FIG. 6.

DETAILED DESCRIPTION OF THE PREFERRED EMBODIMENTS

FIG. 1 illustrates a perspective view of a preferred embodiment of the invention as mounted on a truck. The truck door 10 includes lower and upper mirror brackets 14, 16 respectively supporting mirror 12. The mirror brackets can be any conventional configuration. Typically, the mirror 12 will be provided of an elongate configuration as shown, generally a height similar to the height of a window 11 in which window glass 13 is mounted. The window glass 13 is raisable and lowerable in the door 10 in conventional fashion. That is, the window glass 13 may be raisable and lowerable with a hand-operated crank mechanism, but more preferably it is a power assisted raisable and lowering mechanism such as an electrical, pneumatic or hydraulic power assist. If it is power assisted, typically controls for the passenger side window are available to the driver, so that the window on the passenger side can be raised and lowered by the driver while operating the vehicle.

The apparatus 18 of the invention includes a clamp 20 for clamping to the top of the window glass 13, a bracket 22 extending from the clamp toward the mirror 12 and a wiper blade 24 affixed to the bracket 22 and in contact with the surface of the mirror 12. Details of these components can be seen in FIGS. 2-6.

Thus, as seen in FIGS. 2 and 3, the clamp 20 includes an internally threaded socket 22 and two threaded bores 24, 26. Screws 28, 30 respectively act as set screws in the bores 24, 26, so that the clamp 20 may be slipped over the top of the window glass 13 and the set screws tightened to hold the clamp in place on the top of the window glass.

FIG. 4 illustrates the arm portion of the bracket component of the present invention. A first rod 32 has a first threaded end 34 of a threading matched with the internal threads of the socket 22. A second end is threaded and fits in turnbuckle 36. A second rod 38 has an end 37 threaded into turnbuckle 36 and a forked end 40. Each end of the fork is provided with a hole through which a bolt 42 can pass and receive a nut 44. Thus, the length of the arm 22 may be made adjustable by turning the turnbuckle 36 with respect to the rods 32, 38 to drive the rods into and out of the turnbuckle to thereby adjust the length of the arm. If desired, the arms 32, 38 may be provided of an non-straight configuration, such as the profile shown in FIG. 4, as is suitable to put the wiper blade into intimate contact with the mirror 12.

As seen in FIG. 5, the wiper blade 46 is provided mounted on a wiper support 48, in a conventional windshield wiper construction fashion. The wiper support 48 is provided with a hole 50 which can be aligned with the holes in the forked end 40 so that the bolt 42 can pass through the hole 50 and, upon tightening the nut 44, pinch the support 48 between the forks of forked end of rod 38 to hold the wiper blade 46 in position against the mirror 12. The wiper blade thus has a pivotally adjustable connection to the bracket. The azimuthal angle can be adjusted by loosening the nut 44 and re-tightening it when the desired angle is set. As seen in FIG. 5, a conduit 52 may be provided having one end 58 which can be connected to a windshield washer system of the truck and a second end 56 oriented toward the mirror and held in place by a clamping member 54.

Referring back to FIG. 1, a second mount 60 can be provided to mount a second blade 62. The mount of the second blade may be from the lower mirror support 14 to hold the blade 62 in position against the window glass 13, or, as shown, by a screw connection to the door. Structures analogous to those provided for wiping the mirror 12 may be used.

In operation, the components are mounted on the truck door 10 in a readily apparent fashion. That is, the clamp 20 is affixed to the top of the window glass 13 in proximity to the mirror 12. Then, the blade support 48 is affixed to the forked arm 40 of rod 38. Then, the threaded end 34 of rod 32 may be threaded into the socket 22 of clamp 20. It may be desirable to shorten the length of the arm 22 prior to this step to provide sufficient room for working between the mirror 12 and the glass 13. Then, the length of the arm 22 is adjusted as desired by turning the turnbuckle 36 to bring the blade 48 into contact with the mirror 12. Also at this point, the precise angle between the blade support 48 and the arm 38 may be adjusted as desired by loosening and re-tightening the nut 44 on the bolt 42. Similarly, the mount 60 is installed so that the blade 62 is in contact with the glass 13. If desired the threads of rods 32 and 38 may be potted with epoxy or the like to prevent them form coming out of adjustment. Other techniques to achieve this end will be apparent to those of ordinary skill in the art.

Then, the conduit 52 is connected, with one end 58 connected to the windshield washer fluid supply in any convenient fashion such as by intermediating a T in the existing line and drawing off a side leg of fluid in the conduit 52. The end of the tube is then affixed in place by clamp 54.

The wiping of the mirror 12 can then proceed very readily by lowering the window glass 13, thereby wiping downwardly on the mirror 12. Upon raising the glass 13, the mirror 12 is again wiped. Simultaneously with both of those wipes, the movement of the glass 13 against the blade 62 wipes the glass. Thus, the driver inside the vehicle not only has the mirror wiped, but also the glass which is in his line of sight to the mirror is wiped simultaneously. If desired, the driver can operate the windshield washer system while lowering and raising the window 13 to provide even more effective cleaning of the mirror 12.

As can be appreciated, when a truck operator is traveling at a high rate of speed on an interstate highway with water and mist being thrown all about his vehicle and obscuring his rearview mirror, the presence of the present invention on his truck will be much appreciated. All he will need to do is lower the window glass 13 and raise it again to clean the mirror and the window through which he must look to see the mirror. This will, of course, be even more convenient if the window 13 is a power assisted window. Those of ordinary skill in the art may put various modifications to the embodiments as disclosed herein, and those are deemed to be within the scope of the present invention.

What is claimed is:

1. A truck mirror wiper for a truck having a side mirror to be wiped and a side window glass which may be raised and lowered and through which a driver looks to view the mirror, comprising
    a mount to mount the truck mirror wiper to the window glass,
    a bracket extending from said mount to the proximity of the mirror when said mount is mounted on the window glass, and
    a wiper blade affixed to said bracket in contact with said mirror when said mount is mounted on the window glass,
    whereby a driver may lower or raise the window glass, thereby causing said wiper blade to pass over the mirror to wipe it.

2. A truck mirror wiper as claimed in claim 1 for mounting on a window glass that has a top wherein said mount comprises a clamp to clamp the truck mirror wiper to the top of the window glass.

3. A truck mirror wiper as claimed in claim 2 wherein said clamp comprises a channel fitting over the top of the window glass and set screws passing through a portion of said channel to hold the channel in place on the top of the window glass.

4. A truck mirror wiper as claimed in claim 1 wherein said bracket is of adjustable length.

5. A truck mirror wiper as claimed in claim 4 wherein said bracket includes two lengths of rod, each having a threaded end, and a turnbuckle with two opposed threaded bores into which the two lengths of threaded rod may be screwed a desired distance to adjust the bracket length.

6. A truck mirror wiper as claimed in claim 1 wherein said bracket includes an arm and a blade support and a pivotal connection between said arm and said blade support, so that the azimuthal orientation of the blade may be matched to the azimuthal orientation of the mirror.

7. A truck mirror wiper as claimed in claim 1 further comprising a conduit having two ends, one of which is adapted for operative connection to a truck windshield washer system and an attachement for the other end on said bracket so that windshield washer fluid may be sprayed on the mirror by operation of the windshield washer system.

8. A truck mirror and side window wiper assembly for a truck having a side mirror to be wiped by a truck mirror wiper and a side window glass to be wiped by a side window glass wiper, said window glass may be raised and lowered and through which a driver looks to view the mirror, said assembly comprising
    a mount to mount the truck mirror wiper to the window glass,
    a bracket extending from said mount to the proximity of the mirror when said mount is mounted on the window glass,
    a first wiper blade affixed to said bracket in contact with said mirror when said mount is mounted on the window glass,
    a window wiper mount to mount the side window glass wiper to the truck,
    a window wiper bracket extending from said window glass wiper mount to the proximity of a lower portion of the window when said window glass wiper mount is mounted on the truck, and
    a window glass wiper blade affixed to said window glass wiper bracket in contact with the lower portion of the window glass when said window glass wiper mount is mounted on the truck and the window is raised,
    whereby a driver may lower or raise the window glass, thereby causing said first wiper blade to pass over the mirror to wipe it and also causing the window glass to pass said window glass wiper blade to wipe the window glass.

9. A truck mirror wiper for a truck having a side mirror to be wiped and a side window glass which may be raised and lowered and through which a driver looks to view the mirror, the window glass having a top, comprising
    a clamp to clamp the truck mirror wiper to the top of the window glass,
    a bracket extending from said clamp to the proximity of the mirror when said clamp is clamped on the window glass, including two lengths of rod, each having a threaded end, and a turnbuckle with two opposed threaded bores into which the two lengths of threaded rod may be screwed a desired distance to adjust the bracket length and a blade support with a pivotal connection between one of said rods and said blade support, and
    a wiper blade affixed to said blade support in contact with the mirror when said clamp is clamped to the window glass so that the azimuthal orientation of the blade may be matched to the azimuthal orientation of the mirror,
    whereby a driver may lower or raise the window glass, thereby causing said wiper blade to pass over the mirror to wipe it.

* * * * *